US010924875B2

(12) United States Patent
Settel

(10) Patent No.: US 10,924,875 B2
(45) Date of Patent: Feb. 16, 2021

(54) AUGMENTED REALITY PLATFORM FOR NAVIGABLE, IMMERSIVE AUDIO EXPERIENCE

(71) Applicant: Zack Settel, Montreal (CA)

(72) Inventor: Zack Settel, Montreal (CA)

(*) Notice: Subject to any disclaimer, the term of this patent is extended or adjusted under 35 U.S.C. 154(b) by 0 days.

(21) Appl. No.: 16/422,376

(22) Filed: May 24, 2019

(65) Prior Publication Data

US 2020/0374645 A1    Nov. 26, 2020

(51) Int. Cl.

| | |
|---|---|
| *H04S 7/00* | (2006.01) |
| *G06T 19/00* | (2011.01) |
| *G06T 13/80* | (2011.01) |
| *G06F 3/16* | (2006.01) |
| *G06F 3/01* | (2006.01) |
| *H04R 5/027* | (2006.01) |
| *G06T 13/20* | (2011.01) |

(52) U.S. Cl.
CPC .............. *H04S 7/302* (2013.01); *G06F 3/011* (2013.01); *G06F 3/16* (2013.01); *G06T 13/205* (2013.01); *G06T 13/80* (2013.01); *G06T 19/006* (2013.01); *H04R 5/027* (2013.01); *G06T 2219/024* (2013.01)

(58) Field of Classification Search
None
See application file for complete search history.

(56) References Cited

U.S. PATENT DOCUMENTS

| | | | |
|---|---|---|---|
| 9,396,588 B1* | 7/2016 | Li | G06F 3/011 |
| 2008/0298597 A1 | 12/2008 | Turku et al. | |
| 2012/0230512 A1 | 9/2012 | Ojanperä | |
| 2017/0366914 A1 | 12/2017 | Stein et al. | |
| 2018/0005429 A1* | 1/2018 | Osman | G06T 15/20 |

(Continued)

FOREIGN PATENT DOCUMENTS

WO    WO2019002909 A1    1/2019

OTHER PUBLICATIONS

Schertenleib, Sebastien, et al. "Conducting a virtual orchestra." IEEE MultiMedia 11.3 (2004): 40-49.*

(Continued)

*Primary Examiner* — Ryan M Gray
(74) *Attorney, Agent, or Firm* — Dickinson Wright LLP; Yuri Chumak

(57) ABSTRACT

According to embodiments described in the specification, an exemplary method for providing a navigable, immersive audio experience includes displaying a plurality of augmented reality objects with a live image from a camera on a display, associating audio files with the objects, tracking movement with six degrees of freedom (6DoF) parameters, updating the display upon tilting or movement through a space, and mixing the audio files so that the objects maintain spatial positioning as the portable electronic device is moved through a space. When the portable electronic device is within a threshold distance to an object, the method involves applying a near-field filter to the audio files and rendering the mixed and filtered audio files on an output device in communication with the portable electronic device. In one embodiment, the audio files are music files and the disclosed techniques provide a multi-user, navigable, intimate musical experience in augmented reality.

15 Claims, 9 Drawing Sheets

(56) References Cited

U.S. PATENT DOCUMENTS

| | | | |
|---|---|---|---|
| 2018/0061136 A1* | 3/2018 | Lehtiniemi | H04S 7/303 |
| 2018/0338213 A1 | 11/2018 | Lehtiniemi et al. | |
| 2019/0095451 A1* | 3/2019 | Lehtiniemi | G06T 19/006 |
| 2019/0116448 A1 | 4/2019 | Schmidt et al. | |
| 2019/0377538 A1* | 12/2019 | Jones | G02B 27/0172 |
| 2020/0042792 A1* | 2/2020 | Eronen | G06T 15/10 |
| 2020/0142484 A1* | 5/2020 | Maalouf | G06N 20/00 |
| 2020/0174738 A1* | 6/2020 | Pratt | G06F 3/0484 |

OTHER PUBLICATIONS

Thielen, Elisabeth, et al. "Bringing a virtual string quartet to life." Proceedings of the Second African Conference for Human Computer Interaction: Thriving Communities. 2018.*

Hamilton, Robert, et al. "Multi-modal musical environments for mixed-reality performance." Journal on Multimodal User Interfaces 4.3-4 (2011): 147-156.*

* cited by examiner

AUGMENTED REALITY PLATFORM FOR NAVIGABLE, IMMERSIVE AUDIO EXPERIENCE

FIELD OF TECHNOLOGY

The present specification is directed to augmented reality platforms, and, more particularly, to methods, systems, and devices for providing navigable, immersive audio experiences.

BACKGROUND

Virtual reality (VR) and augmented reality (AR) systems enable interactive experiences of real-world environments. Real world environments can be enhanced by modelling computer-generated information across multiple modes of sensing, including visual, auditory, and haptic, among others.

It is a challenging problem to provide an immersive audio experience to users of VR and AR systems. According to previous approaches, as exemplified in WO2019002909A1, a method of providing an interactive music composition to a user involves calculating the user's position and orientation in virtual space and the position of every sound object in a virtual space and providing output to a left and a right user's ears so that that user perceives three-dimensional sound.

The popular operating systems Android and iOS include augmented reality features under the names ARCore and ARKit, respectively. Using these operating systems, typical AR experiences involve displaying a view from a device's back- or front-facing camera, augmented by other visual content, and giving the user a way to see and interact with the real world around them.

ARKit offers a node-based audio application programming interface, or API, to associate sounds with a virtual object, or node. Audio volume can be automatically mixed based on the user's distance from the node. A similar API is available in ARCore. Resonance Audio is a software development kit, or SDK, provided by Google that includes a spatial audio decoder. Developers can specify the sources of sound within a scene but also shift how that audio moves directionally. Spatial audio techniques are audio amplification and speaker technologies that reproduce the spaciousness of sound in either a real venue such as a live concert or in a fabricated environment through digital signal processing.

Past approaches with signal processing to simulate three-dimensional sound involve transforming sound waves (using head-related transfer function or HRTF filters) to mimic natural sounds waves from a point in a three-dimensional space. Even though sound is produced by two speakers (after applying HRTF filters), the user perceives changes of sound that simulate the path of the sound from the source to the listener's ear (including reflections from walls and floors).

Audio zooming, a technique disclosed in US20120230512, refers to playing different portions of an audio scene, a multi-dimensional environment in which different sounds occur at various times and positions. Spatial sound zooming is discussed in US20080298597, where it is described how individual channel levels can be modified, and a re-mix can be created. This scenario enables directional listening, or auditory "zooming", where the listener can "boost" sounds coming from a chosen direction, or alternatively suppress them.

Drawbacks these approaches include that the audio engines enabled by some of the existing systems use panning, from a central location, to create 3D positional effects, and typically only change the volume or loudness of an audio file based on distance and not a device's or user's pose (position and orientation) and especially at close distances. As well, audio files must typically be pre-loaded on a client device, which may require dedicated and costly hardware, and latency can be a barrier to immersive, multi-user experiences.

Improvements in methods, systems and devices of providing an augmented reality platform for multi-user, navigable, immersive audio experiences are desirable.

The preceding examples of the related art and limitations related to it are intended to be illustrative and not exclusive. Other limitations of the related art will become apparent to those of skill in the art upon a reading of the specification and a review of the drawings.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings.

FIG. 8 is a conceptual diagram of a method of audio zooming of a musical score in accordance with an example.

DETAILED DESCRIPTION

Figure 1:
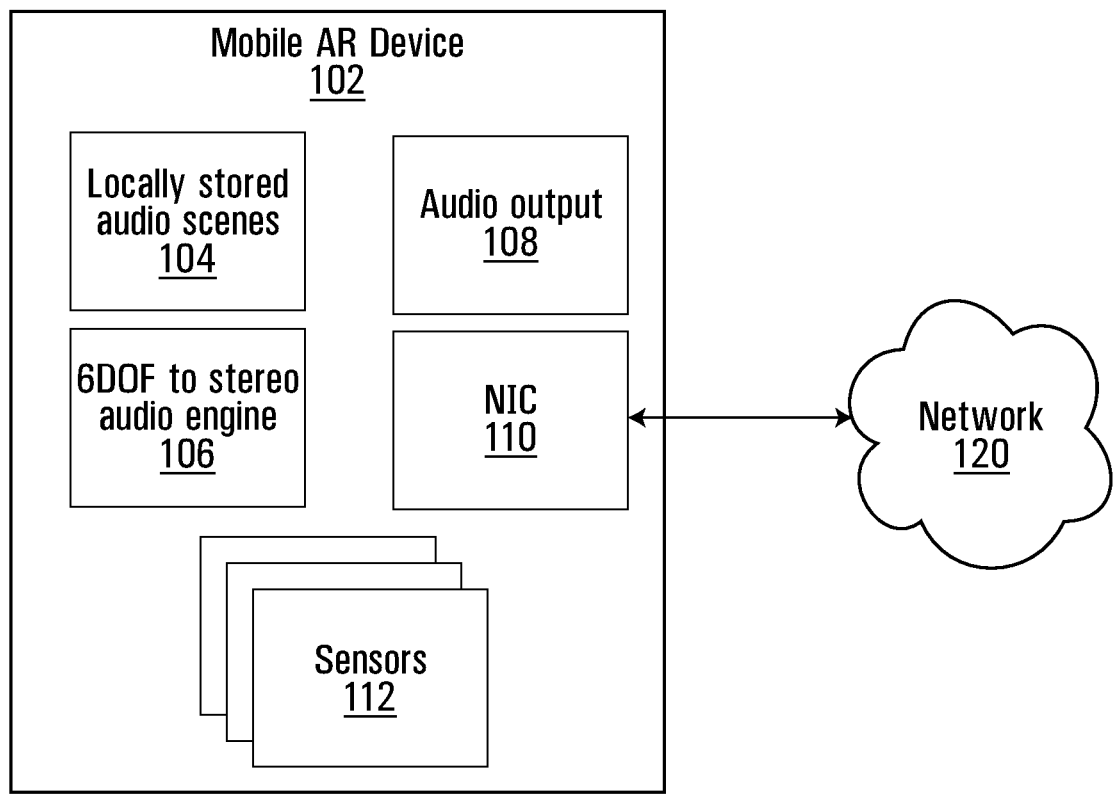
FIG. 1 is a block diagram of an electronic device for providing a navigable, immersive audio experience in accordance with an example.

Representative applications of methods, systems, and devices according to the present application are described in this section. These examples are being provided solely to add context and aid in the understanding of the described embodiments. It will thus be apparent to one skilled in the art that the described embodiments may be practiced without some or all these specific details. In other instances, well-known process steps have not been described in detail to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the scope of the described embodiments.

The following describes an exemplary method, device, and system of providing a navigable, immersive audio experience. The method involves generating a correspondence between a plurality of real world objects sensed by a camera of a portable electronic device and a virtual 3D coordinate space comprising a first horizontal plane for modelling a plurality of augmented reality objects on the first horizontal plane, displaying the plurality of augmented reality objects together on the first horizontal plane with a live image from the camera on a display of the portable electronic device, associating a plurality of audio files with the plurality of augmented reality objects, tracking the portable electronic device's movement with six degrees of freedom (6DoF) parameters comprising three rotation axes (roll, pitch, and yaw) parameters and three translation axes (movement in x, y, and z) parameters, updating the display so that the plurality of augmented reality objects appear to stay in a fixed position relative to the real world objects as the display is tilted to display areas above or below the objects on the first horizontal plane, and as the portable electronic device is moved through a space, and mixing the plurality of audio files so that the plurality of augmented reality objects maintain spatial positioning relative to the real world objects, as the portable electronic device is moved through a space. When a distance calculated from the portable electronic device to one of the plurality of augmented reality objects is within a threshold distance, the method involves applying a near-field filter to the plurality of audio files associated with the said augmented reality objects, and rendering the mixed and filtered plurality of audio files on an output device in communication with the portable electronic device.

Examples of the present specification contemplate a platform for use with one or more portable electronic devices. The platform enables the rendering of correct listener-specific spatial audio cues even though the position and orientation of each listener and device may be unique. According to this example, the one or more portable electronic devices (generically referred to herein as "portable electronic device" and collectively as "portable electronic devices") are connected to a server via a network such as the Internet. Typically, the portable electronic devices are associated with users who download and/or upload audio scenes including audio files, to and from a server. As discussed in greater detail below, the server may be any entity that maintains a data store of audio scenes and audio files. The server may also host a website, application or service that allows a listener, such as a user at the portable electronic device, to request audio scenes or audio files for rendering on an output device in communication with the portable electronic device, as for example, binaural headphones.

With reference to FIG. 1, a block diagram of an example of a portable electronic device 102, also referred to as a mobile AR device, is shown. The portable electronic device 102 may be any of a smart phone, tablet computer, laptop computer, smart watch or other wearable device, Internet of Things appliance or device, virtual reality headset or goggles, augmented reality device, game controller, and the like. According to one example, the portable electronic device 102 includes multiple components, such as a processor (not shown) that controls the overall operation of the portable electronic device 102. Communication functions, including data communications, are performed through a communication subsystem (shown as Network Interface Controller or NIC 110). The NIC 110 receives messages from and sends messages to a network 120. The network 120 may be any type of wired or wireless network, including, but not limited to, a data wireless network. A power source (not shown), such as one or more rechargeable batteries or a port to an external power supply, powers the electronic device 102.

The processor of the portable electronic device 102 interacts with other components, such as a Random Access Memory (RAM) (not shown), data storage (represented as locally stored audio scenes 104), a touch-sensitive display (not shown), one or more speakers (shown as audio output 108), a microphone (not shown), and one or more sensors 112. The sensors 112 can be one or more gyroscopes, one or more accelerometers, one or more cameras (such as front facing camera(s) and back facing camera(s)), short-range communications subsystem, other I/O devices and other subsystems. The touch-sensitive display (not shown) includes a display (not shown) and touch sensors (shown as sensors 112) that are coupled to at least one controller (not shown) and used to interact with the processor of the portable electronic device 102. In one example, sensors 112 include a touch-sensitive display, a microphone, a location service, a camera, an accelerometer, a gyroscope, a barometer, and the like.

According to an example, input via a graphical user interface can be provided via the touch-sensitive display. Alternatively, according to a different example, input can be provided via elicitation using the microphone or input can be provided via the sensors 112 as by, for example, tilting or moving the portable electronic device 102 through a space. Information, such as text, characters, symbols, images, icons, and other items that may be displayed or rendered on a portable electronic device 102, is displayed on the touch-sensitive display via the processor. The information can be displayed or rendered on one or more of the portable electronic devices 102 with spatial orientation that is adjusted based on each listener's point of view, or POV. The touch-sensitive display may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. As mentioned above, the capacitive touch-sensitive display includes one or more touch sensors.

The portable electronic device 102 includes an operating system (not shown) and software programs, applications, or components (not shown) that are executed by the processor and are typically stored in a persistent, updatable store such as the data storage. Additional applications or programs may be loaded onto the portable electronic device 102 through the wireless network 120, the short-range communications subsystem, or any other I/O devices or subsystem.

Generally speaking, the position and orientation of a portable electronic device 102 in space is defined by three components of translation and three components of rotation, which means that it has six degrees of freedom. Typical gaming environments provide five degrees of freedom, a reference to movement in the environment: forwards and backwards, slide left and right, up/down (jump or crouch), yaw (turn left or right), and pitch (look up or down). In the context of the present specification, six degrees of freedom, or 6DoF, in an AR or VR setting refers to the ability to perform arbitrary translations and rotations in three axes of space: x, y and z.

As shown in FIG. 1, the portable electronic device 102 includes a world-tracking engine (not shown) and a 6DoF to stereo audio engine 106. The world-tracking engine uses visual-inertial odometry and combines motion sensor data with computer vision analysis of camera imagery to track the pose (position and orientation in a real-world environment or space) of one or more portable electronic devices 102 in an AR session. The 6DoF to stereo audio engine 106 then takes as input the pose and an audio scene including multiple audio files. In one example, using the processor of the portable electronic device 102, the 6DoF to stereo audio engine 106 generates an output that is a mixed and filtered audio file to simulate three-dimensional sound of the audio scene relative to the user's pose.

An audio scene is composed of one or more audio files, graphics, and logic, representing a real-world environment. Use of the term audio file in the specification refers to any file for storing digital audio data. The audio data can be a raw bitstream in an audio coding format or can be contained in a container format or an audio data format with defined storage layer such as WAV, AIFF, AU, FLAC, ALAC, MPEG, Opus, MP3, Vorbis, WMA, and the like. The term graphics refers to all AR objects to be visually rendered in an AR session typically overlaid on specific objects whose real-world locations are known. In general, a rendered graphic automatically adjusts its perceived position on the display of the portable electronic device 102 as the user turns to face toward or away from the known object or tilts his or her head up or down with respect to it.

Figure 2:
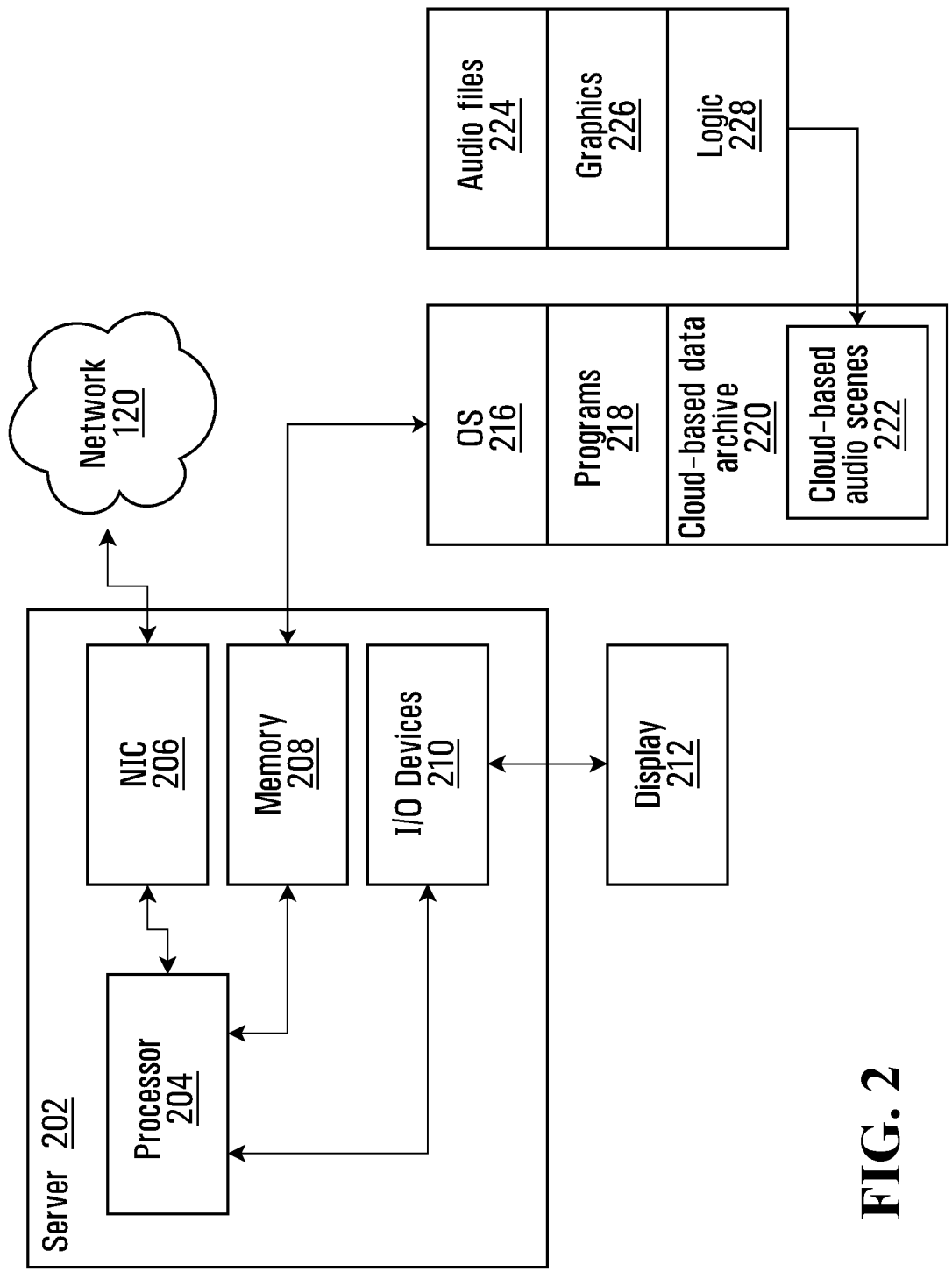
FIG. 2 is a block diagram of a server for providing a navigable, immersive audio experience in accordance with an example.

Turning now to FIG. 2, a block diagram of an example of a server 202 for providing a navigable, immersive audio experience, is shown. The server 202 is typically a server or mainframe within a housing containing an arrangement of one or more processors 204, volatile memory (i.e., random access memory or RAM), persistent memory (e.g., hard disk or solid state devices) (shown as memory 208), and a network interface controller 206 (to allow the server 202 to communicate over the network 120) interconnected by a bus (not shown). Many computing environments implementing the server 202 or components thereof are within the scope of the present specification. The server 202 may include a pair (or more) of servers for redundancy or load-balancing purposes, connected via the network 120 (e.g., an intranet or across the Internet) (not shown). The server 202 may be connected to other computing infrastructure including displays, printers, data warehouse or file servers, and the like. The server 202 may include a keyboard, mouse, touch-sensitive display (or other input devices), a monitor (or display 202, such as a touch-sensitive display, or other output devices) (shown generically as I/O devices 210 in FIG. 1).

The server 202 includes a network interface controller or NIC 206 interconnected with the processor 204 that allows the server 202 to communicate with other computing devices such as one or more portable electronic devices 102 via a link with the network 120. The network 120 may include any suitable combination of wired and/or wireless networks, including but not limited to a Wide Area Network (WAN) such as the Internet, a Local Area Network (LAN), HSPA/EVDO/LTE/5G cell phone networks, Wi-Fi networks, and the like. The NIC 206 is selected for compatibility with the network 120. In one example, the link between the NIC 206 and the network is a wired link, such as an Ethernet link. The NIC 206 thus includes the necessary hardware for communicating over such a link. In other examples, the link between the server 202 and the network 206 may be wireless, and the NIC 206 may include (in addition to, or instead of, any wired-link hardware) one or more transmitter/receiver assemblies, or radios, and associated circuitry.

Still with reference to FIG. 2, one or more data archives 220 store audio scene 222 consisting of audio files 224, graphics 226, and logic 228. Non-limiting examples of data archives 220 include audio scenes for musical compositions of a symphony orchestra, that is, an ensemble that combines instruments from different families, including bowed string instruments such as the violin, viola, cello, and double bass, brass instruments such as the horn, trumpet, trombone and tuba, woodwinds such as the flute, oboe, clarinet and bassoon, and percussion instruments such as the timpani, bass drum, triangle, snare drum and cymbals, each grouped in sections.

Typically, the server 202 may be coupled to the data archives 220 over a bus or a network (such as network 120) and the server 202 may access or cache data from the data archives 220 at run-time, or at predetermined times, using an API (application program interface).

In the above noted example, the server 202 maintains one or more data archives 220. Each data archive 220 maintains audio scenes 220 and can be a database application loaded on the server 202, a stand-alone database server or a virtual machine in communication with the NIC 206 of the server 120, or any other suitable database.

In one example, the server 202 may be integral with the portable electronic device 102. According to this example, at least some of the cloud-based audio scenes 222 may be maintained directly on the portable electronic device 102, permitting use in an "offline" modality.

It will be appreciated that many portable electronic devices 102 can participate in the same simulation of a real-world environment. According to one example, the server 202 can be configured to permit many connected devices 102 to share the same live streamed, or archived, content.

Those having ordinary skill in the related arts will readily appreciate that the preceding portable electronic device 102 and the server 202 are merely illustrative of the broader array of possible topologies and functions. Moreover, it should be recognized that various implementations can combine and/or further divide the various entities illustrated in FIG. 1. and in FIG. 2. For example, the server 202 can be stored or executed on one or more virtual machines. As is known in the art, a virtual machine is an execution environment (typically on a server) that has access to one or more processors, memory, disk drives, network interface cards, and so on. While one or more virtual machines can be instantiated on a single server, the processes of two different virtual machines typically do not interfere with one another (i.e., one virtual machine will not write over the data of another virtual machine, etc.) In the present case, one or more of the functions of the server 202 may be executed on a virtual machine, for example, provided by Amazon Web Services (AWS), Microsoft Azure, or another cloud service.

Impulse Response Capture

Figure 3:
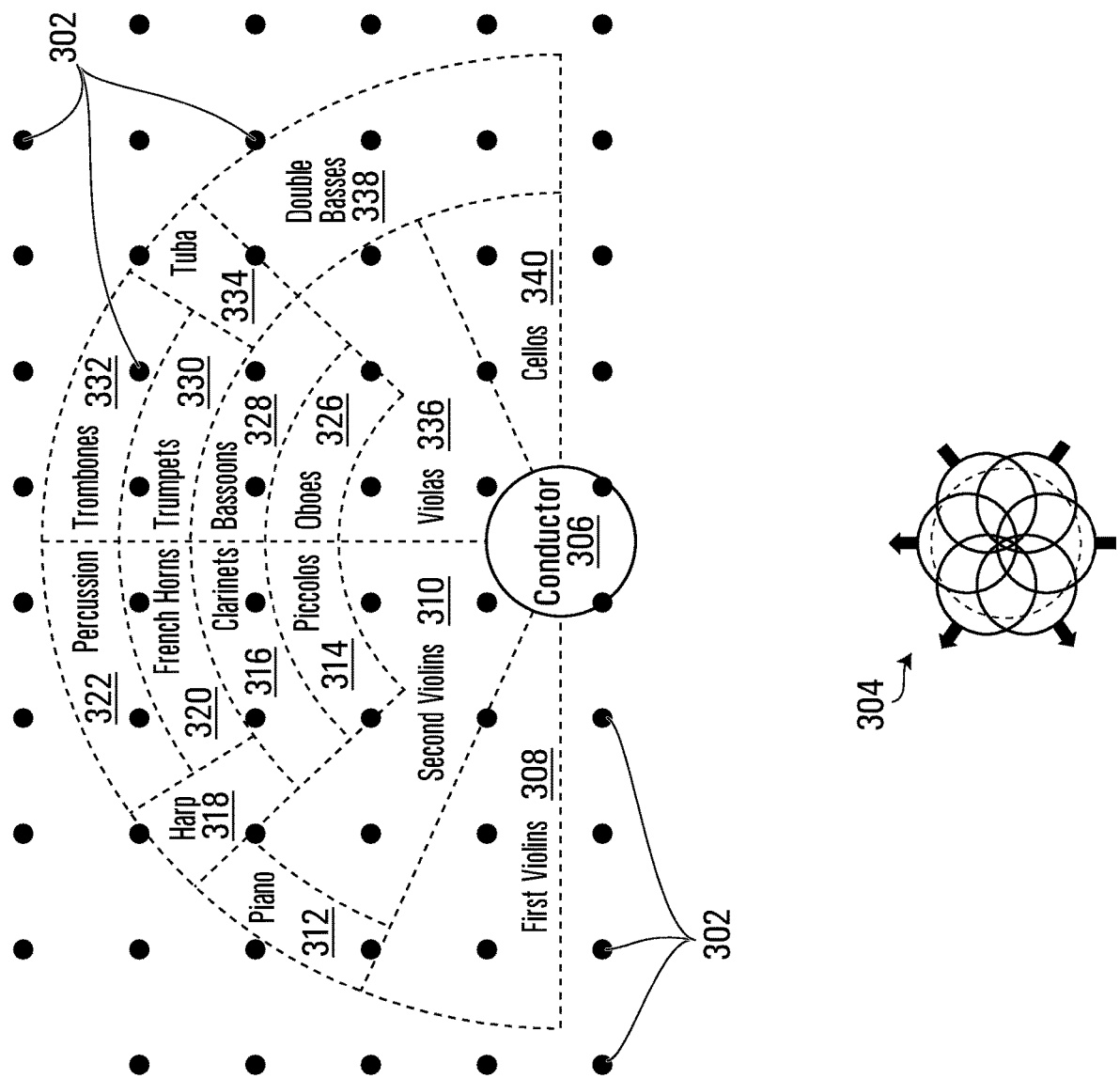
FIG. 3 is a schematic diagram of a method of capturing audio capture for providing a navigable, immersive audio experience in accordance with an example.

Now with reference to FIG. 3, sound sources of a symphony orchestra or any other musical ensemble can be captured. In the example shown in FIG. 3, the ensemble includes a conductor 306, first violins 308, second violins 310, a piano 312, piccolos 314, clarinets 316, a harp 318, French horns 320, percussion 322, oboes 326, bassoons 328, trumpets 330, trombones 332, tuba 334, violas 336, double basses 338 and cellos 340. An array of omnidirectional microphones 302 are placed on stage, separated by 1 to 1.5 meters, each located at a uniform height of approximately 1.6 meters, in one example. Other arrangements can be employed without departing from the scope of the present specification. An ambisonics microphone 304 of order 2 or greater, in one example, can be located in a central location relative to the performance hall or room for reverberation capture. The term ambisonic sound effects, or ambisonics, refers to a technique of capturing sound effects by an array that houses several microphones pointed in different directions. Together these multiple channels (typically four or greater) capture audio not only on the typical horizontal plane, but also above and below the microphone. The ambisonic microphones 304 can record audio from every direction surrounding the microphone and gather a 360-degree representation of sound from a particular location.

Acoustic space capture is a technique used to analyze and reproduce the acoustic characteristics of rooms and halls. There are at least two approaches to this technique, based on sonic or optical capture, but other approaches are intended to be within the scope of the present specification.

Sonic capture refers to sampling the acoustic space from a specific capture location/orientation, using a microphone 304 to capture a tone burst, or dirac impulse (like a gunshot). This recording is called the impulse response of the space and contains a multitude of echoes to that initial impulse. The first 20 milliseconds contain what are often referred to as the early reflections, after which, follow the higher order reflections; then, what is referred to as the reverberation stage, in which distinct echoes are no longer perceivable. This impulse response can be used to "print" the reverberation of the captured space on to any audio signal convolved with it, to reproduce a listening perspective that corresponds to the specific capture location/orientation. Sonic capture techniques are described US20080069366.

In order to capture impulse responses from all surrounding angles (3DoF), at a specific capture location, an Ambisonics capture microphone 304 can be used. In order to capture multi-angle impulse responses from many points in the space (6DoF), an array of Ambisonics capture microphones 304 can be deployed, to create a database of impulse responses, that can be indexed using 6DoF pose information. Using such a database for convolution in the rendering stage, this technique would satisfy the requirements for rendering full 6DoF navigable listening perspectives.

Optical capture uses common scanning techniques to obtain a geometric model of an acoustic space. The generated model is then used as input to an acoustic simulator that uses ray tracing to calculate and generate an impulse response that can be used, in the same way as described above, to "print" the reverberation of the captured space on to any audio signal convolved with it. The advantage of this technique is that an arbitrary and time-variant capture location can be provided for the calculation of the impulse response. As the capture location and orientation corresponds to the listening perspective, this technique would satisfy the requirements for rendering full 6DoF navigable listening perspectives. Optical capture techniques are discussed in WO2014146668A2 and US20170345216.

It has been observed that both 3DoF and 6DoF rendering impulse response and optical capture techniques presented above may be processor and memory intensive. This drawback can be attenuated by equipping the portable electronic devices 102 with GPUs, or Graphics Processing Units for ray-tracing and, also, by techniques of split and/or dual rendering or parallel computing on devices connected over a network).

Conventionally, musical recordings, e.g., stereo masters, are created to produce a musical output that reproduces exactly one listening perspective. The contributing parts of the musical recording, played by instruments, or sung, are combined in a particular weighted sum, arrived at via multi-track recording and mixing techniques, or by spatial arrangement of the instruments at the time of the (mono or stereo) capture.

The arrival of 360-degree (also known as spherical) video has permitted users to view captured video footage from a position-specific perspective, from any angle (3DoF orientation-based panning of captured video) around the fixed capture position. Similarly, sound captured using 360 capture systems such as those using ambisonic microphones, can be reproduced for a listener from any angle around the fixed capture position. To a certain extent, this orientation-based panning provides a first level of "zoomability", allowing a listener to control the audio from specific regions of a real-world environment or sound space.

Advantageously, examples of the present specification enable "walking through" a performance, such as a symphony orchestra performance, and thereby providing a navigable, immersive experience. The term immersiveness refers to simulating sources of sound that appear to come from any direction around the user or listener, including from the sides or above and below, at any distance, arbitrarily near or far. Providing correctly oriented immersive audio experiences to multiple listeners, each in unique positions in a given environment, adds complexity to the challenge. Techniques of the present specification permit multiple users in a shared virtual space to have an experience approaching an intimate, navigable musical experience, where each listener is able to explore musical elements in a simultaneously shared environment.

In this regard, a challenge that has arisen with rendering immersive VR and AR sessions is latency. A user turns his or her head, or tilts their display, and only later does the audio or image change accordingly due to processing and system-based delays. In an extreme case, the latency can make a user ill with symptoms approximating "sea sickness". To address this challenge, as described in FIG. 4, it has been discovered that distributed and/or split rendering can address or at least provide an alternative to current approaches. In the specification, split rendering extends to rendering the 6DoF audio in at least two separate, sequential stages: the first stage inputs the translational pose (3DoF) of the portable electronic device 102 and all audio sources; and the second stage inputs the rotational pose (3DoF) the audio output from stage one. Distributed rendering refers to dividing the task of rendering among several devices, e.g., a client device and a server. Aspects of split rendering and distributed rendering can be combined so that, for example, the second stage of split rendering is processed on the portable electronic device 102, while the first stage is processed on a server, as described in more detail below.

Figure 4:
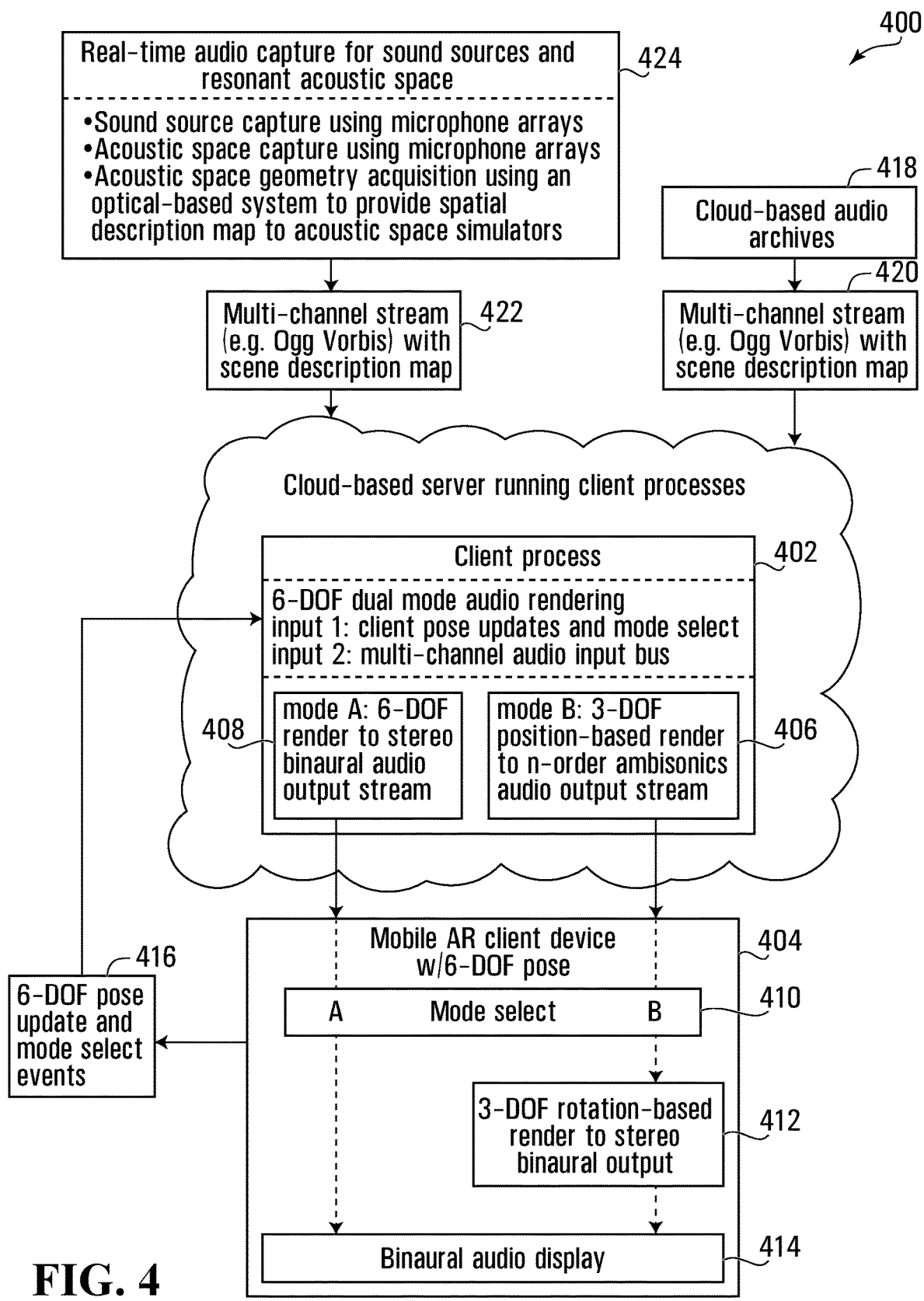
FIG. 4 is a schematic diagram of a system for providing a navigable, immersive audio experience in accordance with an example.

FIG. 4 illustrates a server 202 (shown as 402 in FIG. 4) connected over a network 120 to portable electronic devices 102 (shown as 404 in FIG. 4). A scalable cloud-based dual mode 6DoF navigable audio rendering pipeline is shown at 400 consisting of a real-time audio capture for sound sources and resonant acoustic space, a sound source capture using microphone arrays, an acoustic space capture using microphone arrays, and an acoustic space geometry acquisition using an optical-based system to provide spatial description map input to acoustic space simulators. The system has two input sources: for live (at 424), or archived audio content (at 418). The system has two rendering modes: mode A at 408: remote 6DoF rendering, mode B at 406: distributed 6DoF rendering (3DoF remote/3DoF local). The scene description map contains a scene graph with audio, graphics and logic resources. With distributed rendering, a device's 3DoF translation pose (3D position) can be used to produce a partial rendering of the audio scene, corresponding to the listening point of view in ALL directions. The output of this rendering stage can be captured to an ambisonics signal, as input to the second rendering stage where that ambisonics signal is in turn, rendered to a binaural format, based on that user's 3DoF orientation pose (rotation) corresponding to the listening point of focus in a particular direction.

Advantageously, audio scenes can be created from pre-existing audio content based on: 1) standard multi-track recordings, 2) instrumental segregation of standard stereo audio files, and/or live multi-channel audio streams.

When coupling a 6DoF user tracking device to the corresponding 6DoF user perspective in a rendered audio scene, the quality of the user experience can be degraded by latency, whereby the rendered audio image is no longer synchronized with the instantaneous user's listening position and orientation in the referenced audio scene. In such a case, a certain amount of delay occurs between the time the user changes his or her 6DoF pose, and the consequent adjustment to that user's listening perspective in the audio scene. Research in this field has established minimum perceptually acceptable tolerances for system wide, tracker to rendered audio display latencies. In the local pipeline shown in FIG. 4 as 406 for local rendering of local content, the latency issues have been mitigated, as the 6DoF user pose data is provided by the sensors 112, the rendering process and the audio display system are all local to the portable electronic device 102, and network propagation of the data is not necessary or reduced throughout.

In the case of the scalable cloud-based dual mode 6DoF navigable audio rendering pipeline shown as 408 in FIG. 4, the rendering process operates on a remote server 202, which streams a partially or fully rendered audio signal to a binaural audio display 414 (which can be the audio output 108 of the portable electronic device 102). At the same time, the sensors 112 stream the client 6DoF listening pose data to update the client's rendering process on the remote server 202. As network propagation delays of rendered audio streams and user 6DoF listening pose updates are unavoidable, strategies to mitigate resulting latencies are adopted. Edge computation for audio rendering provides an effective way to minimize or reduce latency. An additional strategy is to partially render the user's audio perspective on a client process running on the server 202, where the user's 3DoF positional pose data is used to render the his or her listening perspective from a corresponding certain point in the audio scene. This partial rendered signal is in turn, streamed to the portable electronic device 102, where the signal further rendered to the user's specific 3DoF listening orientation pose relative to the incidence of sound sources in the surrounding audio scene. By rendering the latter locally on the client (the portable electronic device 102), rotational latency is eliminated from the rendering process, having no or reduced negative effect on the user's experience of immersiveness.

Use of the term rendering in the present specification refers to the automatic process of generating an image or audio from a model or scene file by means of computer programs via the portable electronic device 102. The term rendering extends to translation of captured ambisonic signals to binaurally encoded audio.

Past approaches to AR rendering systems typically render the user's audio on a mobile device running the AR experience and computing power and streaming bandwidth may be relatively limited. In part due to these limitations, audio scene complexity and depth (number of simultaneous sources) can be limited. Furthermore, for applications involving audio scenes with multiple live input audio source streams (e.g., 32, 64, 128, or more channels), the limitations of the mobile device may be prohibitive. Examples of the present specification provide a system and method to render audio on a remote device from the mobile device where these limits do not intervene, providing an improved experience (e.g., distributed rendering) for latency-sensitive applications. As suggested above, use of the term "distributed rendering" extends to remote or parallel rendering of sub-processes that have been split or divided such as, in one example, 3DoF (translational), or, in other examples, full 6DoF (translation and rotational) rendering on the remote device. The term "split rendering" in two or more stages, without regard to the location of rendering (e.g., cloud, local or some combination of both).

Furthermore, navigable audio experiences on prior or existing systems require dedicate and costly sensing and computing hardware, particularly for audio capture or navigation. Examples of the present specification enable a system operating in part on existing portable electronic devices that users may already own.

Further advantages extend to the user interface. According to examples of the present specification, navigable audio experiences on existing systems may use tethered virtual navigation input devices such as joysticks, game controllers, or the like. Examples of the present specification provide "direct navigation", that is, spatial user navigation in a real-world environment is translated to equivalent or similar audio navigation in the user experience.

Moreover, existing approaches to audio zooming typically do not provide use of near-field audio rendering to musical sources, or to "tunable" zooming. Advantageously, use of audio zooming techniques according to the present specification permits adjust the audio based on timbre masking effects that interfere with the user's cognitive tasks for feature recognition and differentiation. Unlike the zooming technique disclosed in US20120230512, examples of the present specification permit the user to "tune" or modify sound characteristics including diffusivity properties, near-field transition radius, reverberation to direct signal ratio, and sound source redistribution.

Figure 5:
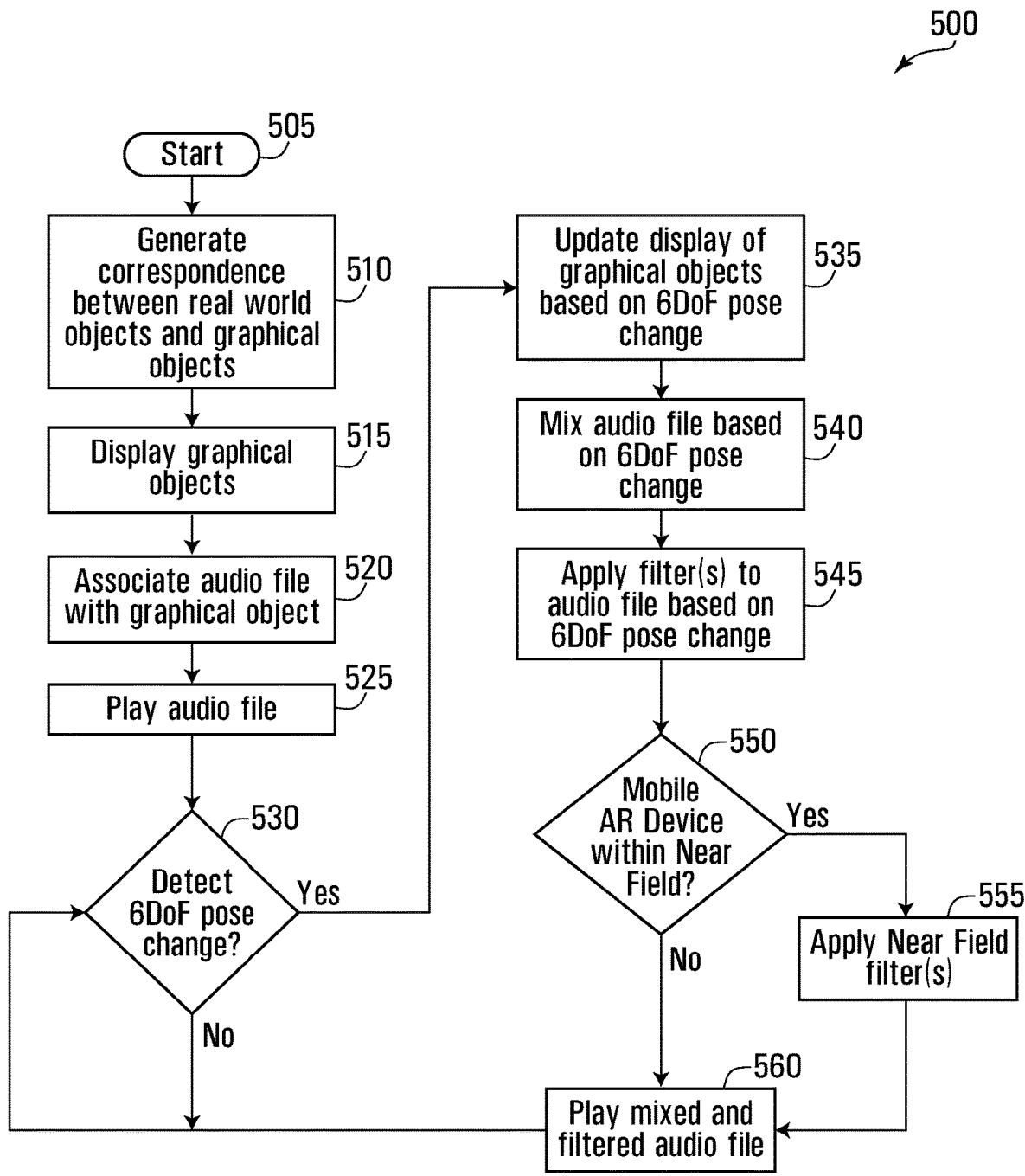
FIG. 5 is a flowchart illustrating a method of providing a navigable, immersive audio experience in accordance with an example.

A flowchart illustrating an example of a method of providing a navigable, immersive audio experience at a portable electronic device 102 is shown in FIG. 5. The method may be carried out by software executed by, for example, the processor of the portable electronic device 102. Coding of software for carrying out such a method is within the scope of a person of ordinary skill in the art given the present description. The method may contain additional or fewer processes than shown and/or described and may be performed in a different order. Computer-readable code executable by at least one processor of the portable electronic device 102 to perform the method may be stored in a computer-readable storage medium, such as a non-transitory computer-readable medium.

The method starts at 505. At 510, a correspondence between real world objects and graphical objects is generated and displayed on a display of the portable electronic device 102. Audio files from an audio scene are associated with the graphic objects at 520 and audio is rendered or played at 525. When a 6DoF pose change of the portable electronic device 102 is detected at 530, the display is updated at 535, and the audio file is mixed at 540 and filtered at 545 to provide a three-dimensional sound according to the techniques disclosed in the present specification. At 550, if the portable electronic device 550 is within a near-field or threshold distance of a given graphical object, additional filters are applied at 555. The mixed and filtered audio file is played at 560.

Figure 6A:
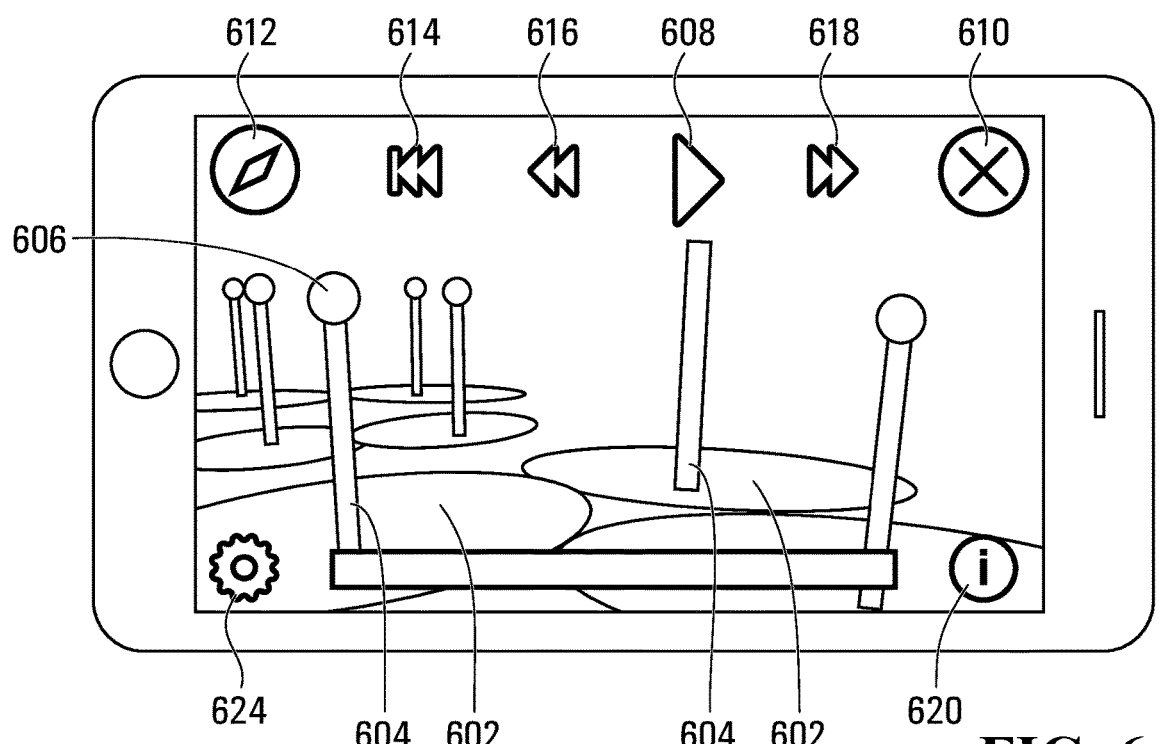
FIG. 6A and FIG. 6B are views illustrating client application screenshots in accordance with an example.
Figure 6B:
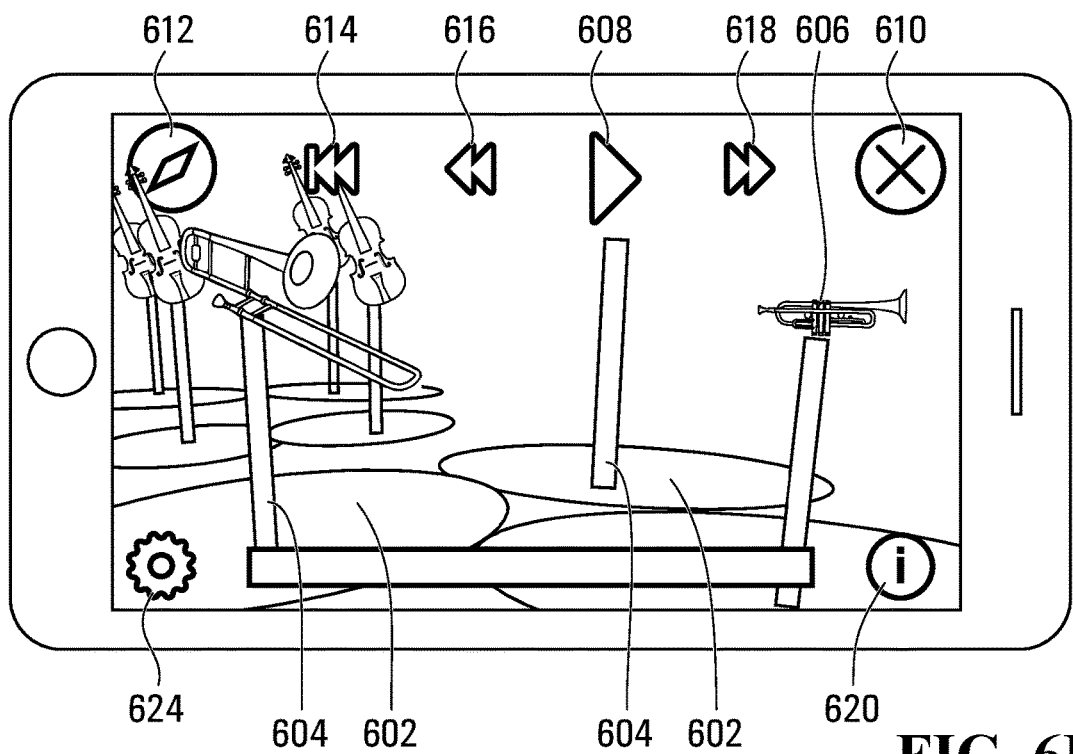

Examples of screenshots on the display of the portable electronic device 102 when loaded with an application to operate in accordance with the present disclosure are depicted in FIG. 6A and FIG. 6B and described with continued reference to FIG. 5.

With reference to FIG. 6A, screenshot 600 may be launched by accessing an application loaded on the portable electronic device 102. In one example, the application may require user authentication to proceed further. An AR session is shown including areas 602, nodes 604 and sprites 606. User interface components are also shown including re-localization 612, play/pause 608, previous track 616, next track 618, exit to a menu screen 610, info 620, and settings 624. In FIG. 6B, the sprites 606 are graphics showing the instruments or ensemble groups. The sprites 606 can be animated and can provide a visual indicator of a sound parameter such as loudness. It will be appreciated that moving the portable electronic device 102 through the space within the AR session updates the display and the audio, which may be a binaural output on headphones or transaural speakers paired with the portable electronic device 102.

Figure 7:
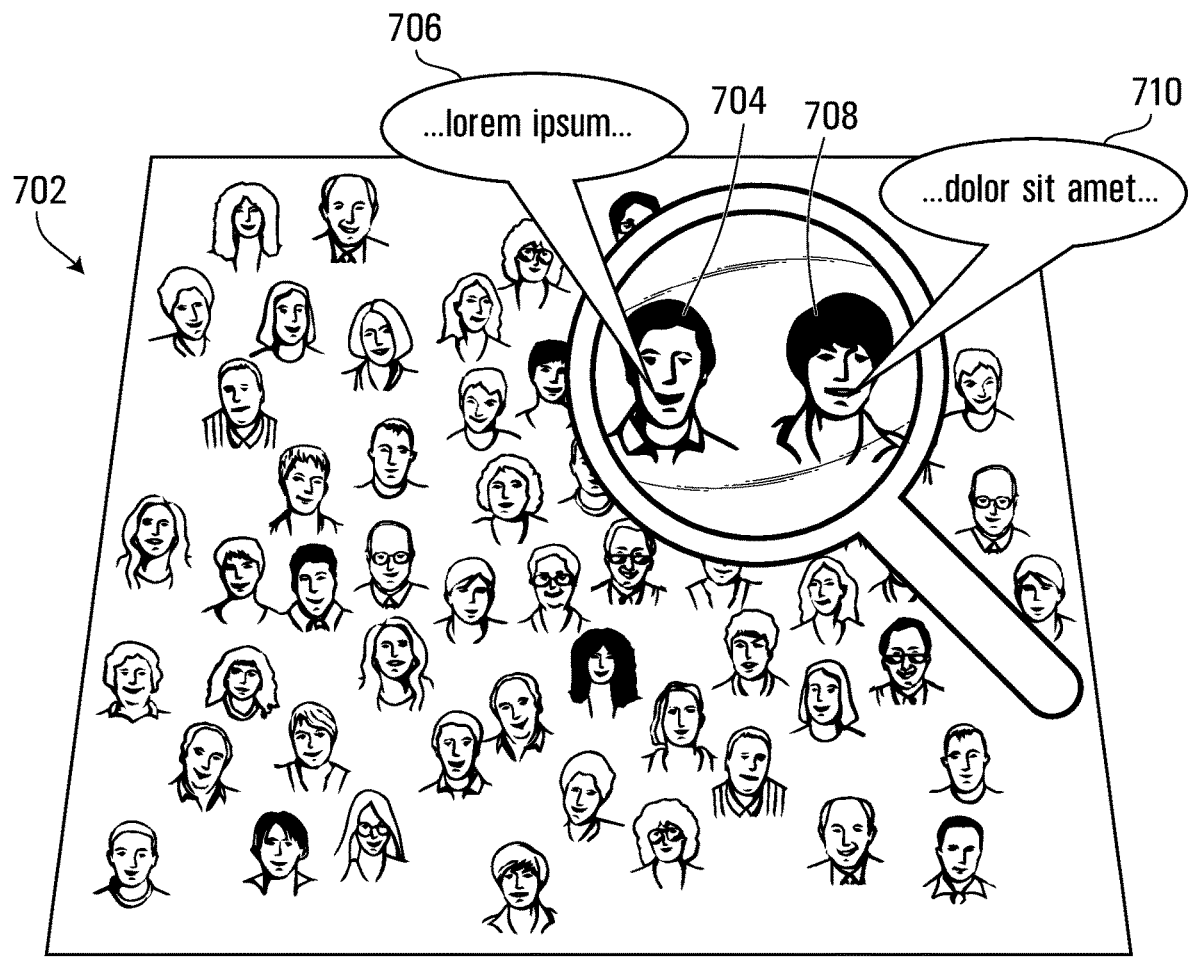
FIG. 7 is a conceptual diagram illustrating a navigable, immersive AR environment in accordance with an example.
Figure 8:
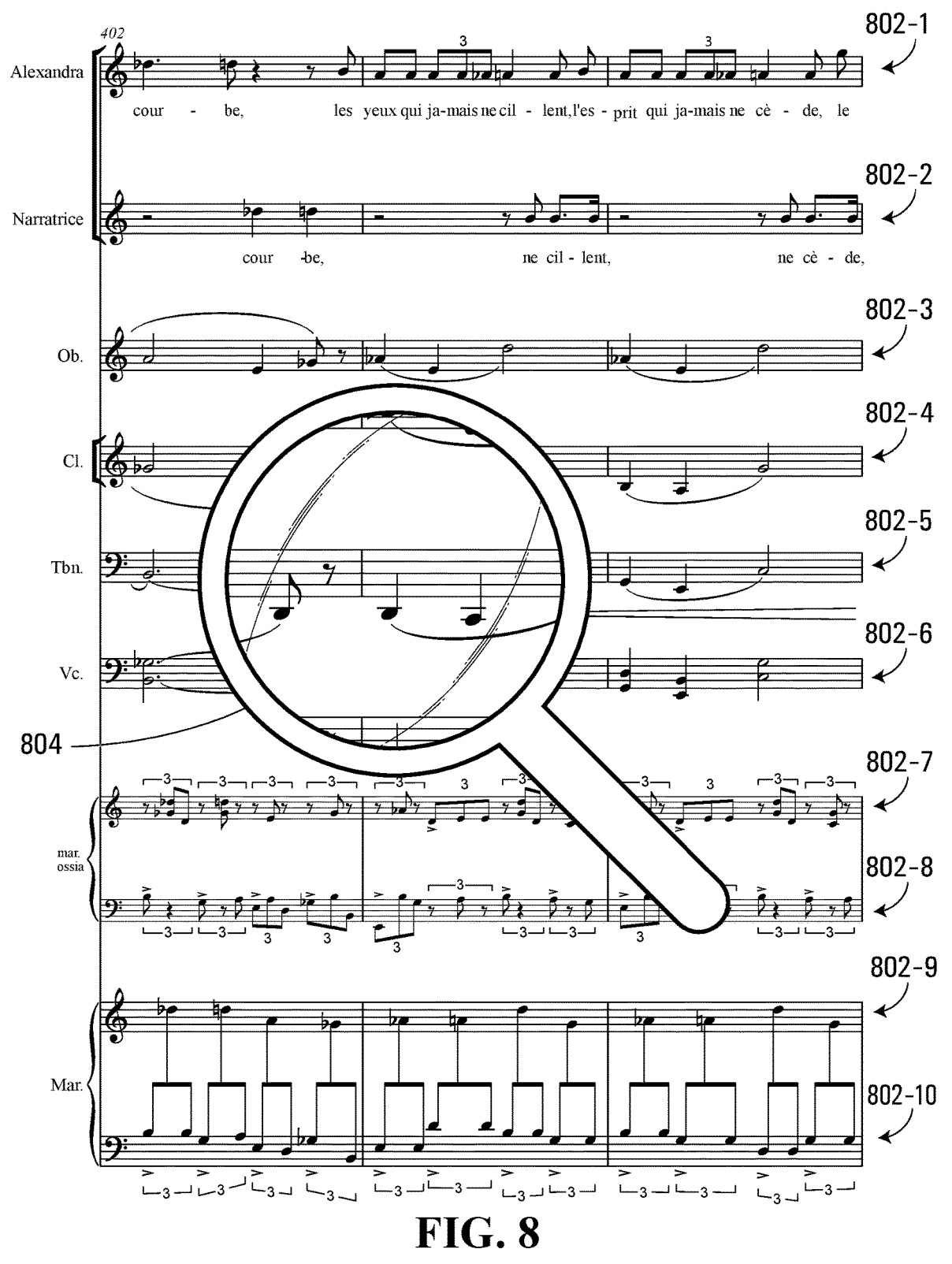

Now with reference to FIG. 7, when combined with 3DoF orientation-based panning, 3DoF positional (or translational) displacement in the audio scene provides a stronger and encompassing ability to limit, or "focus" or "zoom in" on sonic features of the audio scene 702, from an arbitrary position in the audio scene, to experience audio files (depicted as word bubbles 706 and 710) from sound sources 704 and 708, respectively. AR devices that control and render audio in 6DoF are operable for audio zooming in accordance with examples of the present specification. A conceptual diagram of how this technique of audio zoom is applied to musical compositions is shown in FIG. 8. Listeners can focus on a particular instrument from the composition selected from the instruments on lines 802-1, 802-1, . . . , up to 802-10.

Figure 9:
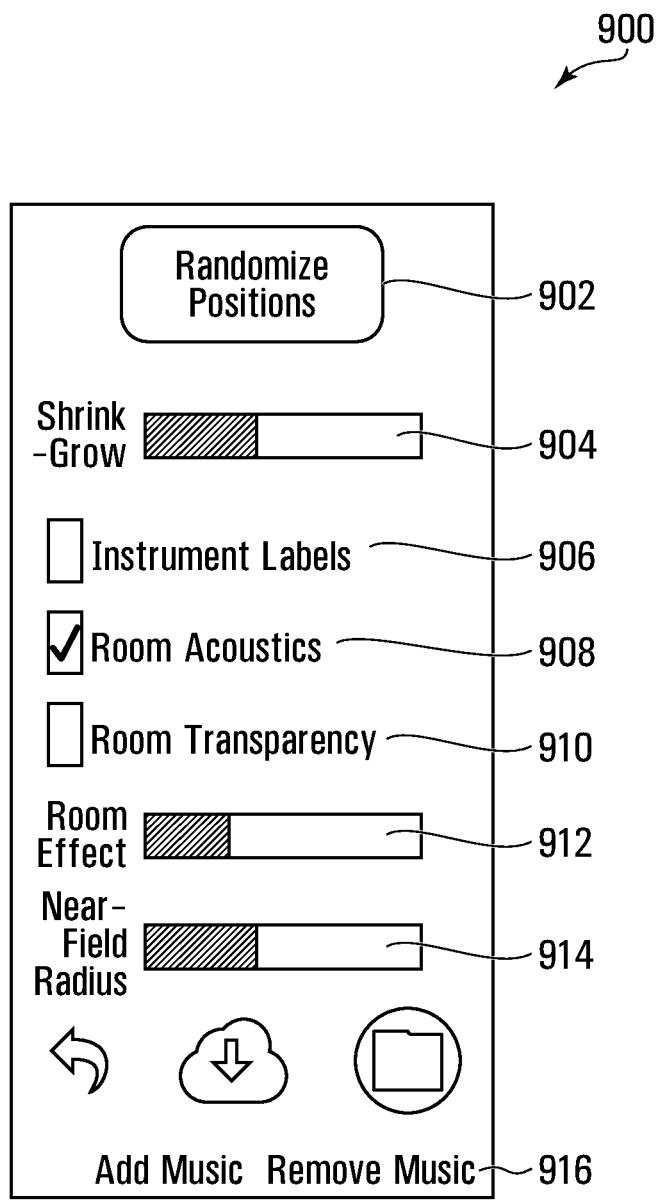
FIG. 9 is a view illustrating a client application screenshot in accordance with an example.

With reference to FIG. 9, screenshot 900 may be launched by accessing a settings menu of the application of FIG. 6A. An array of menu items is shown. Touching or selecting randomize positions 902 re-distributes the positions of the sound sources represented as sprites 606 (shown in FIG. 6A). Touching or selecting on shrink-grow 904 spatially expands or compresses the sprites 606 in the scene. Touching or selecting room effect 912 controls the amount of reverberation, allowing the user to further differentiate audio sources in the near-field. Touching on the near-field filter radius 914 permits adjustment of the near-field filter from, for example, 0 to 5 meters (however any other range of distance is intended such as 0 to 2 meters, 0 to 5 meters, 0 to 10 meters, etc., is intended to be within the scope of the present specification). The settings permit adjustment of the rendered audio scene and provide additional user interaction and perspective into the audio scene. Touching or selecting room acoustics 908 toggles the reverberation effect, and room transparency 910 toggles the graphic display of the geometric structure used to model reverberation.

Advantageously, use of the "audio zoom" techniques disclosed herein enhance the prominence and discernibility of a given sound source or sources in an audio scene, by isolating a given sound source or sources, from the rest of the audio scene, and in the process, revealing otherwise hidden relationships and structures, sonic, musical, semantic or other audio-carried information types.

A near-field audio experience is a sonic encounter with sound sources in very close proximity to a user's head. Near-field audio experiences are unlike sonic encounters with sound sources that are further away in that the information the ears receive can be very different. Due to this, an effective way to deliver a near-field audio experience to a user's ears is to ensure that the signals to each ear remain separate. Binaural techniques use headphones or other specialized audio display techniques to transmit a left and right signal to the respective ear. Open air systems, such as loudspeakers cannot do this, due to the "cross-talk" phenomena, in which leakage across left and right channels occurs. Near-field audio rendering is advantageous with audio zoom is that it more differentiates sound sources that are localized around a listener in an audio scene, making for a "sharper" and more efficient zoom effect. It has been observed that current approaches to near-field audio techniques are focused on the use of dedicated near-field HRTF deployed when rendering audio sources within a given distance of the listener.

Previous approaches simulate three-dimensional sound using amplitude differences and possibly some kind of spatialization. In contrast, techniques of the present specification leverage 6DoF rendering, providing additional quality and depth of audio zoom in part due to the use of binaural processing and near-field filtering. The present techniques enable added quality or reach for challenging audio zoom applications, such as music listening experiences, in which the spatial and spectral differentiation among sound sources enhances the zooming process among complex instrumental sounds. Audio and music zoom provide new levels of intimacy in audio distribution.

The use of near-field filters to simulate the behaviour of sound sources at close range, can be employed to enhance the audio zoom effect. Binaural 3D audio works by applying to a sound a unique filter for each ear based on the 3D position of the sound source. The term "filter" is a general term and indicates any type of sound filter from simple EQ to a complex reverberation filter.

The present specification discloses a method of providing a navigable, immersive audio experience to one or more listeners at a portable electronic device including the steps of generating a correspondence between a plurality of real-world objects sensed by a camera of the portable electronic device and a virtual 3D coordinate space comprising a first horizontal plane for modelling a plurality of augmented reality objects on the first horizontal plane, displaying the plurality of augmented reality objects together on the first horizontal plane with a live image from the camera on a display of the portable electronic device, associating a plurality of audio files with the plurality of augmented reality objects, tracking the portable electronic device's movement with six degrees of freedom (6DoF) parameters comprising three rotation axes (roll, pitch, and yaw) parameters and three translation axes (movement in x, y, and z) parameters, updating the display so that the plurality of augmented reality objects appear to stay in a fixed position relative to the real world objects as the display is tilted to display areas above or below the objects on the first horizontal plane, and as the portable electronic device is moved through a space, mixing the plurality of audio files so that the plurality of augmented reality objects remain static, or maintain spatial positioning, relative to the real-world objects, as the portable electronic device is moved through a space. When a distance calculated from the portable electronic device to one of the pluralities of augmented reality objects is within a threshold distance, applying a near-field filter to the plurality of audio files associated with the said augmented reality objects, and rendering the mixed and filtered plurality of audio files on an output device in communication with the portable electronic device.

In one example, the plurality of audio files can be maintained in a data store of a server in communication over a network with the portable electronic device. In this example the method includes transmitting from the portable electronic device to the server, over the network, the six degrees of freedom (6DoF) parameters of the portable electronic device in relation to an audio scene involving the plurality of augmented reality objects, determining a selection of audio files for association with the plurality of augmented reality objects based on a distance of the portable electronic device to some of the plurality of augmented reality objects in the audio scene and transmitting to the portable electronic device the selection of audio files.

The mixing and the filtering steps can be performed by the server. The selection of audio files can be transmitted to the portable electronic device for on-demand streaming rendering on the output device. In one alternative example, the mixing and the filtering steps can be performed by the portable electronic device and the selection of audio files can be transmitted for mixing and filtering on the portable electronic device before rendering on the output device.

The plurality of augmented reality objects can be sprites representing a symphony orchestra instrument or a symphony orchestra section. The sprites can be animated and provide a visual indicator of a parameter, such as loudness, associated with the augmented reality object.

In one example, the method can further include receiving input from a plurality of microphones placed in a spaced apart formation at a real-world environment on a first horizontal plane, capturing audio associated with the real-world environment using the plurality of microphones and storing the captured audio in a plurality of stored audio files and capturing pose parameters for the plurality of microphones for modelling as the plurality of augmented reality objects.

The real-world environment can be a symphony orchestra stage.

Additional input from an additional microphone capturing resonance parameters can be used for modelling the room characteristics of the real-world environment under capture.

The plurality of audio files can be adjusted to modify sound characteristics including diffusivity properties, near-field transition radius, reverberation to direct signal ratio, and sound source redistribution.

The portable electronic device can be one of a tablet computer, a smart phone, a wearable device, a virtual reality headset, a pair of virtual reality goggles, an augmented reality device, and an Internet of Things device. The output device can be a pair of headphones or transaural speakers. The rendering can be a binaural rendering in stereo to the pair of headphones or to the transaural speakers.

In accordance with an example of the present specification, a server includes a server processor and a server memory operable to store instructions that, when executed by the sever processor, causes the server to maintain, in the server memory, a data store comprising a plurality of audio scenes comprising audio files, graphics, and logic, perform a session handshake with one of a plurality of remote portable electronic devices, receive a rendering request and device pose parameters from the remote portable electronic device for rendering an augmented reality audio scene, activate a subset of the plurality of audio files based on the rendering request and the device pose parameters, provision a result of the rendering request and transmit, to the remote portable electronic device, the result of the rendering request. In one example, the plurality of portable electronic devices share the augmented reality audio scene.

It will be recognized that while certain features are described in terms of a specific sequence of steps of a method, these descriptions are only illustrative of the broader methods disclosed herein and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

Furthermore, the various aspects, embodiments, implementations or features of the described embodiments can be used separately or in any combination. Various aspects of the described embodiments can be implemented by software, hardware or a combination of hardware and software. The described embodiments can also be embodied as computer-readable code on a computer-readable medium. The computer-readable medium is any data storage device that can store data which can thereafter be read by a computer system. Examples of the computer-readable medium include read-only memory, random-access memory, CD-ROMs, HDDs, DVDs, flash drives, magnetic tape, and optical data storage devices. The computer-readable medium can also be distributed over network-coupled computer systems so that the computer-readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A method of providing a navigable, immersive audio experience for one or more listeners at a portable electronic device comprising the steps of:
generating a spatial correspondence between a plurality of real-world objects sensed by a camera of the portable electronic device and a virtual 3D coordinate space comprising a first horizontal plane for modelling a plurality of augmented reality objects on the first horizontal plane;
displaying the plurality of augmented reality objects together on the first horizontal plane with a live image from the camera on a display of the portable electronic device;
associating a plurality of audio files with the plurality of augmented reality objects;

tracking the portable electronic device's movement with six degrees of freedom (6DoF) parameters comprising three rotation axes (roll, pitch, and yaw) parameters and three translation axes (movement in x, y, and z) parameters;

updating the display so that the plurality of augmented reality objects appear to stay in a fixed position relative to the real world objects as the display is tilted to display areas above or below the objects on the first horizontal plane, and as the portable electronic device is moved through a space;

mixing the plurality of audio files so that the plurality of augmented reality objects maintain special positioning relative to the real-world objects, as the portable electronic device is moved through a space;

when a distance calculated from the portable electronic device to one of the pluralities of augmented reality objects is within a threshold distance, applying a near-field filter to one of the plurality of audio files associated with the said one of the pluralities of augmented reality objects;

when the distance is within a threshold distance, isolating the said one of the plurality of audio files based on the 6DoF parameters; and rendering the mixed, filtered, and isolated, plurality of audio files on an output device in communication with the portable electronic device, wherein the portable electronic device is configured to simulate a zoom effect on the isolated audio file based on the 6DoF parameters.

2. The method of claim 1 wherein the plurality of audio files is maintained in a data store of a server in communication over a network with the portable electronic device, the method further comprising:

transmitting from the portable electronic device to the server, over the network, the six degrees of freedom (6DoF) parameters of the portable electronic device in relation to an audio scene involving the plurality of augmented reality objects;

determining a selection of audio files for association with the plurality of augmented reality objects based on a distance of the portable electronic device to some of the plurality of augmented reality objects in the audio scene; and transmitting to the portable electronic device the selection of audio files.

3. The method of claim 2 wherein the mixing and the filtering steps are performed by the server and the selection of audio files are transmitted to the portable electronic device for on-demand streaming rendering on the output device.

4. The method of claim 2 wherein the mixing and the filtering steps are performed by the portable electronic device and the selection of audio files are transmitted for mixing and filtering on the portable electronic device before rendering on the output device.

5. The method of claim 1 wherein the plurality of augmented reality objects comprises sprites representing an entity comprising one of a symphony orchestra instrument and a symphony orchestra section.

6. The method of claim 5 wherein the sprites are animated and provide a visual indicator of a parameter associated with the augmented reality object.

7. The method of claim 6 wherein the parameter is loudness.

8. The method of claim 1 further comprising the steps of:
receiving input from a plurality of microphones placed in a spaced apart formation at a real-world environment on a first horizontal plane;
capturing audio associated with the real-world environment using the plurality of microphones and storing the captured audio in a plurality of stored audio files; and
capturing pose parameters for the plurality of microphones for modelling as the plurality of augmented reality objects.

9. The method of claim 8 wherein the real-world environment comprises a symphony orchestra stage.

10. The method of claim 8 further comprising receiving input from an additional microphone capturing resonance parameters for modelling the room characteristics of the real-world environment under capture.

11. The method of claim 8 wherein the plurality of audio files is adjusted to modify sound characteristics comprising diffusivity properties, near-field transition radius, reverberation to direct signal ratio, and sound source redistribution.

12. The method of claim 1 wherein the portable electronic device is selected from one of: a tablet computer, a smart phone, a wearable device, a virtual reality headset, a pair of virtual reality goggles, an augmented reality device, and an Internet of Things device; and wherein the output device comprises a device selected from one of a pair of headphones and transaural speakers.

13. The method of claim 12 wherein the rendering comprises a binaural rendering in stereo to the output device.

14. A server comprising: a server processor; and a server memory operable to store instructions that, when executed by the sever processor, causes the server to:
maintain, in the server memory, a data store comprising a plurality of audio scenes comprising audio files, graphics, and logic;
perform a session handshake with one of a plurality of portable electronic devices, receive a rendering request and device pose parameters from the one of the plurality of remote portable electronic devices for rendering an augmented reality audio scene;
activate a subset of the plurality of audio files based on the rendering request and the device pose parameters;
isolate one of the plurality of audio files based on the pose parameters;
provision a result of the rendering request based on the activated and isolated audio files; and
transmit, to the one of the plurality of remote portable electronic devices, the result of the rendering request.

15. The server of claim 14 wherein the plurality of portable electronic devices share the augmented reality audio scene.

* * * * *